(12) United States Patent
Smaardyk et al.

(10) Patent No.: US 8,878,126 B2
(45) Date of Patent: Nov. 4, 2014

(54) METHOD FOR INSPECTING A SUBTERRANEAN TUBULAR

(75) Inventors: John Edward Smaardyk, Houston, TX (US); Donald Steinman, Missouri City, TX (US); Russel Hertzog, Georgetown, TX (US)

(73) Assignee: GE Oil & Gas Logging Services, Inc., Houston, TX (US)

( * ) Notice: Subject to any disclaimer, the term of this patent is extended or adjusted under 35 U.S.C. 154(b) by 153 days.

(21) Appl. No.: 13/557,777

(22) Filed: Jul. 25, 2012

(65) Prior Publication Data

US 2013/0009049 A1    Jan. 10, 2013

Related U.S. Application Data

(63) Continuation-in-part of application No. 13/332,543, filed on Dec. 21, 2011, which is a continuation-in-part of application No. 12/496,163, filed on Jul. 1, 2009.

(51) Int. Cl.
  *G01V 5/12*   (2006.01)
  *E21B 43/04*  (2006.01)
  *E21B 47/00*  (2012.01)

(52) U.S. Cl.
  CPC ............ *E21B 43/04* (2013.01); *G01V 5/125* (2013.01); *E21B 47/0002* (2013.01)
  USPC ...................................... 250/269.3

(58) Field of Classification Search
  CPC ........................................ G01V 5/125
  USPC ........................................ 250/269.3
  See application file for complete search history.

(56) References Cited

U.S. PATENT DOCUMENTS

| 4,705,944 | A * | 11/1987 | Coope .................. 250/254 |
| 2004/0020646 | A1 * | 2/2004 | Flecker et al. ........... 166/253.1 |
| 2008/0061225 | A1 | 3/2008 | Orban et al. |
| 2010/0017134 | A1 | 1/2010 | Steinman et al. |
| 2010/0149534 | A1 | 6/2010 | White |
| 2012/0119077 | A1 | 5/2012 | Smaardyk et al. |

OTHER PUBLICATIONS

PCT Search Report and Written Opinion dated Nov. 20, 2013 from corresponding Patent Application No. PCT/US2013/050488.

* cited by examiner

*Primary Examiner* — Constantine Hannaher
*Assistant Examiner* — Hugh H Maupin
(74) *Attorney, Agent, or Firm* — Bracewell & Giulliani LLP

(57) ABSTRACT

Substances on or adjacent a tubular disposed in a subterranean wellbore can be detected and/or their presence identified by monitoring gamma rays scattered from the substances. The substances include deposits on a sidewall of the tubular and liquid contained in the tubular. Examples of the deposits include asphaltenes, paraffins, scale, sand, and the like. Gamma rays are strategically directed from a tool disposed within the tubular and to adjacent a sidewall of the tubular. Some of the gamma rays scatter from the substances adjacent the tubular and are detected with detectors set a designated axial distance from the gamma ray source.

18 Claims, 9 Drawing Sheets

METHOD FOR INSPECTING A SUBTERRANEAN TUBULAR

CROSS REFERENCE TO RELATED APPLICATIONS

This application is a continuation-in-part and claims the benefit of co-pending U.S. application Ser. No. 13/332,543 filed Dec. 21, 2011, which is a continuation-in-part of and claims the benefit of U.S. application Ser. No. 12/496,163 filed Jul. 1, 2009, the full disclosures of which are hereby incorporated by reference herein for all purposes.

BACKGROUND

1. Field of Invention

The invention relates generally to inspecting tubulars in a subterranean wellbore. More specifically, the present invention relates to a device and method that uses a radiation source for inspecting a subterranean tubular and a radiation detector for detecting or identifying the presence of an unwelcome or egregious substance or substances deposited in and/or adjacent the tubular.

2. Description of Prior Art

Subterranean wellbores used for producing hydrocarbons typically are lined with a casing string that is cemented to the formation intersected by the wellbore. An inner casing string may also be inserted within the first casing string and cemented in place. Fluid produced from the well flows to the surface within production tubing that is inserted inside the inner casing string. Over the life of a typical well the production tubing may be removed so that remediation, repair, or flow enhancement operations may be conducted in the well. There may also be a need at some time for removal of a portion or for all of the casing.

Generally drilling fluids fill the annular space between the concentric tubulars. Particulates, such as barite, within the drilling fluids may settle out or precipitate over time and form a cement like substance that binds together the concentric tubulars and prevents the removal of the inner tubular from the wellbore. While cutting tools can sever the tubulars to enable removing the unstuck portion, the tubular cannot be removed if the cut is made at a depth below where the tubulars are adhered together. Alternatively, too shallow a cut can leave an undesirably long portion of free pipe extending above the point of adhesion. Asphaltene or sand mixed with heavy hydrocarbons can form blockages inside the production tubulars which will limit well production capability. Junk-baskets, gauge rings and dummy tools run through the production tubing have been used to look for blockages.

SUMMARY OF THE INVENTION

A method of inspecting a tubular in a subterranean wellbore is disclosed. In one example the method includes directing radiation from a radioactive source positioned in a logging tool into the adjacent sidewall of the tubular, detecting radiation scattered from a material in the annulus adjacent the tubular, estimating a rate and energy of the detected radiation, and identifying the substance based on the rate and energy of the detected radiation. In one example, the radiation is a gamma ray and the source is a $^{137}$Cs gamma ray source having energy of about 662 keV. In this example, the Compton scattered radiation when detected has energy of from about 250 keV to about 650 keV. In one example, the step of detection is performed using a detector axially offset from the source. The emitted radiation can be directed in a substantially conical pattern from the source and wherein the energy of the detected radiation is dependent upon an angle of scatter of the radiation. The substance may be asphaltene in the annulus and adhered to the tubular, scale deposited in the annulus adjacent the tubular, sand on the tubular, as well as combinations thereof. The method can further include estimating a location of the substance, and help in removing the substance from the tubular based on the steps of identifying the substance and estimating the location of the substance. Optionally, the substance can be a production fluid inside or other deposits in the tubular, and where the tubular is production tubing.

Also provided herein is a method of imaging a subterranean wellbore. In this example method a logging instrument is provided that has a radiation source and a scattered radiation detector. In this example the method further includes introducing the logging instrument in a tubular that is inserted into the wellbore, directing radiation from the source so that some of the radiation scatters from materials adjacent the tubular to define scattered radiation, detecting the scattered radiation with a scattered radiation detector, and identifying the substance based on a rate and energy of the scattered radiation detected. Optionally, a conically shaped guide is provided close to the radiation source and positioned in the logging instrument so that an apex of the guide is directed towards the source and the guide has an axis that is substantially parallel with an axis of the tubular. In an alternate embodiment, the energy of the scattered radiation corresponds to an angle of scatter of the detected radiation. In one example, the material is one or more of asphaltene, a paraffin, scale, sand, or combinations thereof.

BRIEF DESCRIPTION OF DRAWINGS

Some of the features and benefits of the present invention having been stated, others will become apparent as the description proceeds when taken in conjunction with the accompanying drawings, in which.

Figure 1:
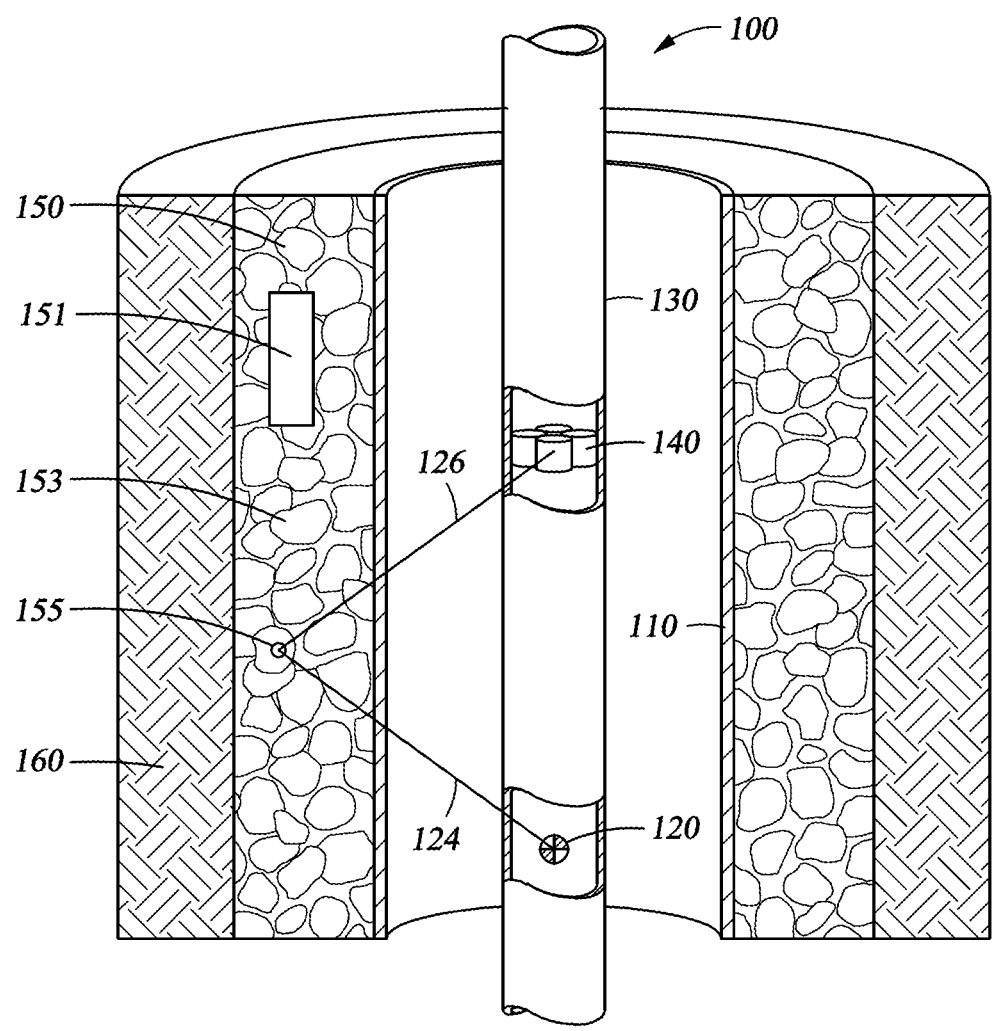
FIG. 1 a schematic of an example embodiment of a downhole imaging tool having a low energy radiation source and detectors disposed in a wellbore in accordance with the present invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method of the present disclosure will now be described more fully hereinafter with reference to the accompanying drawings in which embodiments are shown. The method of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation. Accordingly, the improvements herein described are therefore to be limited only by the scope of the appended claims.

Referring now to FIG. 1 a downhole imaging tool 100 is shown positioned in a "base-pipe" or inner steel housing 110 of a gravel pack. It is recognized that a tool housing 130 may be constructed of any light metal wherein the term, "light metal," as used herein, refers to any metal having an atomic number less than 23. Downhole imaging tool 100 includes at a minimum a housing or pipe 130 carrying a radiation source 120 and plurality of detectors 140. In one example embodiment, gamma radiation source 120 is centrally located in housing 130. Optionally, detectors 140 are symmetrically spaced apart azimuthally at a constant radius, but also positioned within housing 130. In other words, in one example, the radius on which detectors 140 are spaced apart is less than the radius of the housing 130. Radiation source 120 emits radiation, in this case, gamma rays 124 into gravel pack 150.

The textured pattern of gravel pack 150 indicates possible regions of gravel pack that could be gravel-filled or not. For example, center region 151 may constitute a void in gravel pack 150 that has been filled with completion fluids or production fluids whereas other regions 153 may constitute portions of the gravel pack that are properly completed or fully sand filled. Of course, those skilled in the art, with the benefit of this disclosure, will appreciate that these are for illustrative purposes only and that a void or vug could take any shape and any position relative to tool 100.

In the example of FIG. 1, gamma rays 124 propagating into gravel pack 150 are Compton scattered (as at point 155), with a loss of some energy, back towards detectors 140 located within downhole imaging tool 100. The lower-energy gamma rays 126 are detected by detectors 140. The count-rate intensity of Compton scattered gamma rays 126 depends on, among other factors, the density of the gravel pack material. Hence, higher count rates represent higher density in the gravel pack, whereas lower count-rates represent lower density as a result of fewer gamma rays being back-scattered towards the detectors.

In an example, radiation source 120 includes barium, cesium, some other radiation source, or combinations thereof. By utilizing a source such as this, and because the detectors are located close to the source, detected energy originates only from a short distance into the gravel pack immediately adjacent a screen. For these same reasons, in one example detectors 140 are positioned in housing 130 proximate to radiation source 120. In one example embodiment, radiation source 120 and detectors 140 are within about 3 to about 3.5 inches apart along the length of tool 100.

Shielding (not shown in FIG. 1) may be applied around radiation source 120 to collimate or otherwise limit the emission of radiation from radiation source 120 to a restricted longitudinal segment of gravel pack 150. In an embodiment, such shielding is a heavy metal shield, such as sintered-tungsten, which collimates the pathway for the emitted gamma rays into the gravel pack. Likewise, as described in more detail below, similar shielding may be used around each detector to limit the detector viewing aperture to only those gamma rays that are primarily singularly-scattered back to the detector from a specific azimuthal section of the gravel pack.

Further, the energy levels of the emitted gamma rays 124 may be selected to assess gravel pack density at varying depths or distances from downhole imaging tool 100. As one example, the radiation from a gamma ray source, such as a $^{133}$Ba source, may be used to emit various energy levels. Alternatively, a gamma ray radiation source with energy close to that of $^{137}$Cs may be used.

Figure 2:
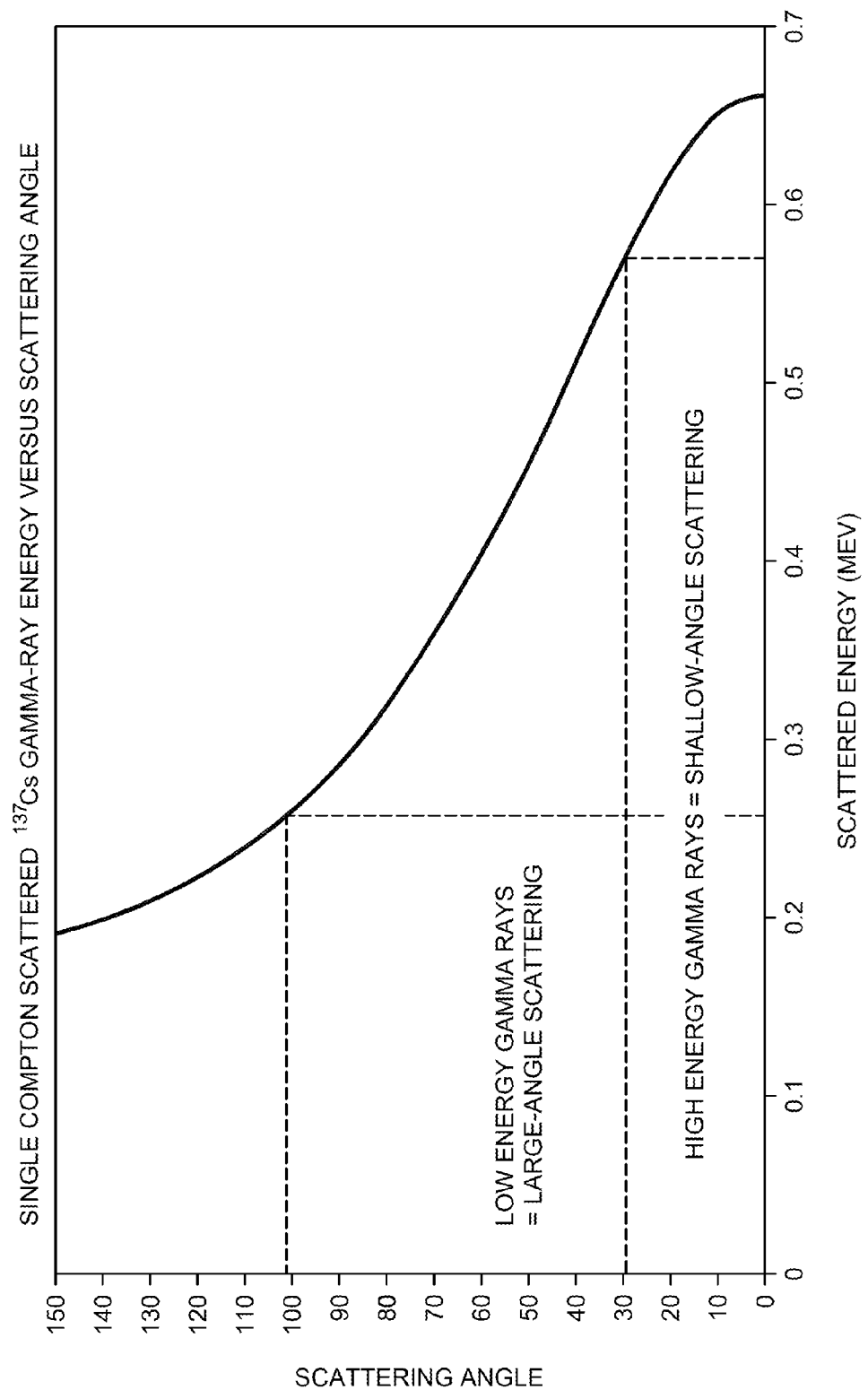
FIG. 2 is a graph of an example of energy dependence of a single Compton-scattered 0.662 MeV Cesium-137 gamma ray versus the scattering angle in accordance with the present invention.

In addition, the energy of Compton-scattered gamma rays depends on the scattering angle, as shown in FIG. 2. In an example, a careful choice of collimation angles and energy detection range can be used to discriminate scattering from different regions in the well-bore tubulars. Higher-energy single-scattered Compton gamma-rays, such as that shown in FIG. 2, come from shallow-angle scattering, and can be used to sense scattering materials close to the tool, such as asphaltene deposits inside the production tubing. In an optional embodiment, the support volume for the Compton-scattered gamma rays is defined by the scattering angle and the detected gamma-ray energy so that different energy windows in the logging tool can sense different regions in the well bore.

Techniques exist for converting radiation count rates from multiple detectors positioned axially around the logging tool into a complete 2D profile map of the gravel pack integrity include the SYSTAT's Table Curve 3D method. Other techniques include, but are not limited to, MATLAB, IMAGE, and advanced registration and techniques for making mosaic representations from data points can be used to map the base-pipe and gravel-pack environment. Also, 3D geostatistical-based software can be adapted to convert the basic gamma-ray count rates to generate a map of the gravel-pack environment. In this way, the integrity of a gravel pack or formation may be determined.

To produce accurately oriented maps, the azimuthal angle of the logging tool relative to the high side of the borehole is determined. This orientation can be determined using any orientation device known in the art. Orientation devices may contain one or more attitude sensors used to determine orientation of the logging tool with respect to a reference vector. Examples of suitable orientation devices include, but are not limited to, those orientation devices produced by MicroTesla of Houston, Tex. Each set of gamma ray measurements may be associated with such an orientation so that a 2D profile map of the gravel pack can be accurately generated in terms of the actual azimuthal location of the material in the gravel pack.

Figure 3:
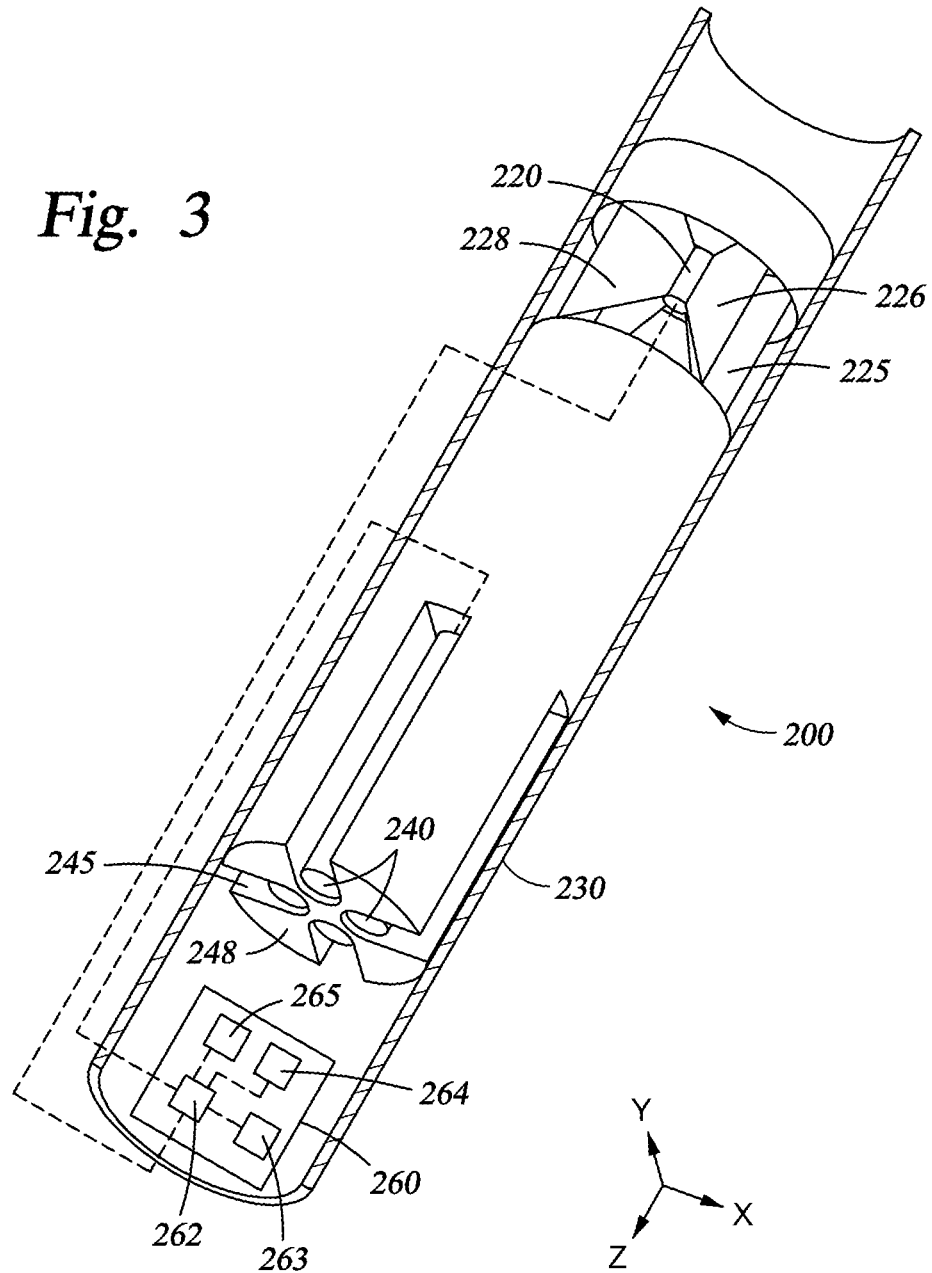
FIG. 3 is a perspective view of one embodiment of the tool of FIG. 1.

FIG. 3 illustrates a perspective view of one embodiment of a gravel pack imaging tool. As shown, downhole imaging tool 200 includes a housing 230 which carries radiation source 220, source collimator 225, and a plurality of radiation detectors 240 in an array. The array of detectors 240 may be positioned at a fixed distance from radiation source 220. In certain embodiments, detector arrays may be positioned at differing distances from radiation source 220. Additionally, detector arrays on either side of radiation source 220 are also envisioned in certain embodiments. Electronics 260 may also be located in housing 230 or wherever convenient.

Radiation source 220 may be one or more radiation sources, which may include any suitable low-energy gamma ray source capable of emitting gammy ray radiation from about 250 keV to about 700 keV. Gamma ray sources suitable for use with embodiments of the present invention may include any suitable radioactive isotope including, but not limited to, radioactive isotopes of barium, cesium, a LINAC, high energy X-rays (e.g. about 200+ keV), or any combination thereof. Radiation from radiation source 220 may be continuous, intermittent, or pulsed.

In one example embodiment shown in FIG. 3, a radiation source 220 is centrally located in housing 230. In the illustrated embodiment, source 220 is positioned along the axis of housing 230.

Gamma-Ray collimator 225, which is optional in certain embodiments, may be-configured adjacent to the source 220 in order to directionally constrain radiation from the radiation source 220 to an azimuthal radiation segment of the gravel pack. For example, collimator 225 may include fins or walls 226 adjacent source 220 to direct gamma ray propagation. By directing, focusing, or otherwise orienting the radiation from radiation source 220, radiation may be guided to a more specific region of the gravel pack. It is appreciated that in certain embodiments, a heavy-met shutter mechanism could be further employed to direct radiation from radiation source 220. Additionally, the radiation energy may be selected, by choosing different isotopic sources, so as to provide some lithological or spatial depth discrimination.

In the illustrated embodiment, collimator 225 constrains radiation from source 220. In this embodiment, collimator 225 is also conically shaped as at 228, in the direction of detectors 240 to collimate the gamma rays from source 220. Of course, those skilled in the art will appreciate that collimator 225 may be configured in any geometry suitable for directing, focusing, guiding, or otherwise orienting radiation from radiation source 220 to a more specific region of the gravel pack.

In one non-limiting example, the radiation transmitted from source 220 into a gravel pack (such as gravel 150 of FIG. 1) is Compton scattered back from the gravel pack to tool 200 where the back-scattered radiation may be measured by radiation detectors 240. Radiation detectors 240 can be any plurality of sensors suitable for detecting radiation, including gamma ray detectors. In the illustrated embodiment, four detectors are depicted, although any number of detectors can be utilized. In another example embodiment, three detectors or six detectors are utilized; where optionally, each detector is disposed to "view" a different segment of the gravel pack. Employing multiple detectors, the tool can image the entire circumference of the gravel pack in separately identifiable segments. The resolution of the image of the overall circumference can depend on the number of detectors, the energy of the gamma rays and the degree of shielding provided around each detector.

In certain embodiments, gamma ray detectors may include a scintillator crystal that emits light proportional to the energy deposited in the crystal by each gamma ray. A photomultiplier tube may be coupled to the crystal to convert the light from the scintillation crystal to measurable electron current or voltage pulse, which is then used to quantify the energy of each detected gamma ray. In other words, the gamma rays' energies are quantified, counted, and used to estimate the density of the gravel pack adjacent a screen. Photomultiplier tubes may be replaced with high-temperature charge-coupled devices (CCD) or micro-channel photo-amplifiers. Examples of suitable scintillator crystals that may be used include, but are not limited to, NaI(Tl) crystals, BGO, and Lanthanum-bromide, or any combination thereof. In this way, count-rates may be measured from returned radiation, in this case, returned gamma rays. The intensity of the Compton scattered gamma rays depends on, among other factors, the density of the gravel pack material. Hence, lower density represents gaps in the gravel pack and lower count-rates represent lower density as a result of fewer gamma rays being back-scattered towards the detectors.

Still referring to FIG. 3, in an example embodiment detectors 240 are mounted inside a housing at a radius smaller than the radius of housing 230 inset from the surface of housing 230. Likewise, while they need not be evenly spaced, in the illustrated embodiment, detectors 240 are evenly spaced on the selected radius. Although the illustrated example shows four detectors 240 spaced apart 90 degrees from one another, those skilled in the art will appreciate that any number of multiple detectors can be utilized in the invention. Further, while the embodiment illustrates all of the detectors 240 positioned at the same distance from source 220, they need not be evenly spaced. Thus, for example, one detector (or a multi-detector array) might be spaced apart 12 centimeters from the source, while another detector (or a detector array) is spaced apart 20 centimeters from the source or any other distance within the tool.

Similarly, in another embodiment, detectors 240 can be positioned both above and below source 220. In such a case, collimator 225 would be appropriately shaped to guide gamma rays in the direction of the desired detectors. In such embodiments with multiple detectors disposed on both sides of the radiation source, additional shielding may be provided between the collimators to prevent radiation scattering (i.e. cross-contamination of the radiation) from different segments of the gravel pack.

Each detector 240 may be mounted so as be shielded from the other detectors 240. While any type of shielding configuration may be utilized for the detectors 240, in the illustrated embodiment, collimator 248 is provided with a plurality of openings or slots 245 spaced apart around the perimeter of collimator 248. Although openings 245 could have any shape, such as round, oval, square or any other shape, in one example embodiment openings 245 are shaped as elongated slots and will be referred to as such herein.

A detector 240 is mounted in each slot 245, so as to encase detector 240 in the shield. The width and depth of the slot 245 can be adjusted as desired to achieve the desired azimuthal range. In certain embodiments the length of slots 245 can be as long as the sensitive region of the gamma-ray detector (e.g. the crystal height). It will be appreciated that since a detector is disposed within the slot, the detector is not on the surface of the collimator where it might otherwise detect gamma rays from a larger azimuthal range. In an example embodiment, slot 245 is 360/(number of detectors) degrees wide and the detector face to inner diameter of the pressure housing is a few millimeters deep (e.g. from about 2 to about 5 mm). However, tighter collimation is possible. Optionally, the azimuthal range of each slot is limited to 360/(number of detectors) degrees. In this way, the view of each radiation detector 240 may be more focused on a particular region of the gravel pack. Additionally, such shielding eliminates or at least mitigates radiation scattered from one detector to another detector. As can be seen, each detector is separated from one another by radiation absorbent material. By eliminating detector-to-detector radiation scattering, more precise azimuthal readings are achieved.

While source collimator 225 is shown as a single, integrally formed body, having fins 226, and conical surface 228, it need not be and could be formed of separate structural components, such as a source collimator combined with a detector collimator 248, so long as the shielding as described herein is achieved.

In the illustrated embodiment, the region of housing 230 around the opening in source collimator and detectors 240 may be fabricated of beryllium, aluminum, titanium, or other low atomic number metal or material, the purpose of which is to allow more of the gamma rays to enter detectors 240. This design is especially important for lower energy gamma rays, which are preferentially absorbed by any dense metal in the pressure housing.

Alternatively, or in addition to detector shielding or collimator 248, an anti-coincidence algorithm may be implemented in electronics 260 to compensate for detector-to-detector radiation scattering. In this way, a processor can mitigate the effects of multiply-detected gamma rays via an anti-coincidence algorithm. In certain embodiments, electronics 260, 262, and 264 are located above detectors 240 or below source 220.

Electronics 260 may include processor 262, memory 263, and power supply 264 for supplying power to gravel pack imaging tool 200. Power supply 264 may be a battery or may receive power from an external source such as a wireline (not shown). Processor 262 is adapted to receive measured data from radiation detectors 240. The measured data, which in certain embodiments includes count rates, may then be stored in memory 263 or further processed before being stored in memory 263. Processor 262 may also control the gain of the photomultiplier or other device for converting scintillations into electrical pulses. Electronics 260 may be located below source 220 and above detectors 240 or removed therefrom.

In one embodiment, the tool further includes an accelerometer, a 3 axis inclinometer or attitude sensor to unambiguously determine the position of an azimuthal segment. In certain embodiments, a compass device may be incorporated to further determine the orientation of the tool.

Gravel pack imaging tool 200 may be constructed out of any material suitable for the downhole environment to which it is expected to be exposed, taking into account in particular, the expected temperatures, pressures, forces, and chemicals to which the tool will be exposed. In certain embodiments, suitable materials of construction for source collimator 225 and detector collimator 248 include, but are not limited to, sintered tungsten (known as heavy-met), lead, dense and very-high atomic number (Z) materials, or any combination thereof.

Further, while a 1 11/16 inch diameter configuration tool is illustrated, the tool 100 can be sized as desired for a particular application. Those skilled in the art will appreciate that a larger diameter tool would allow more detectors and shielding to provide further segmentation of the view of the gravel pack.

This tool may be deployed to measure the integrity of the gravel pack in new installations and to diagnose damage to the gravel pack from continuing production from the well. A person of ordinary skill in the art with the benefit of this disclosure will appreciate how to relate the log results of count rates and inferred densities of gravel pack material to the structure of the pack and to reason from the results to the condition of the pack.

Figure 4A:
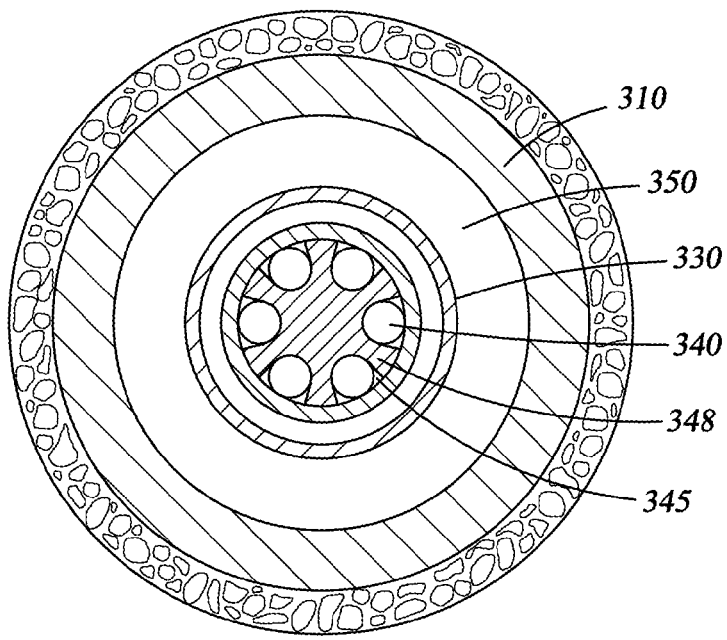
FIGS. 4A and 4B are sectional views of an example embodiment of the tool of FIG. 3.
Figure 4B:
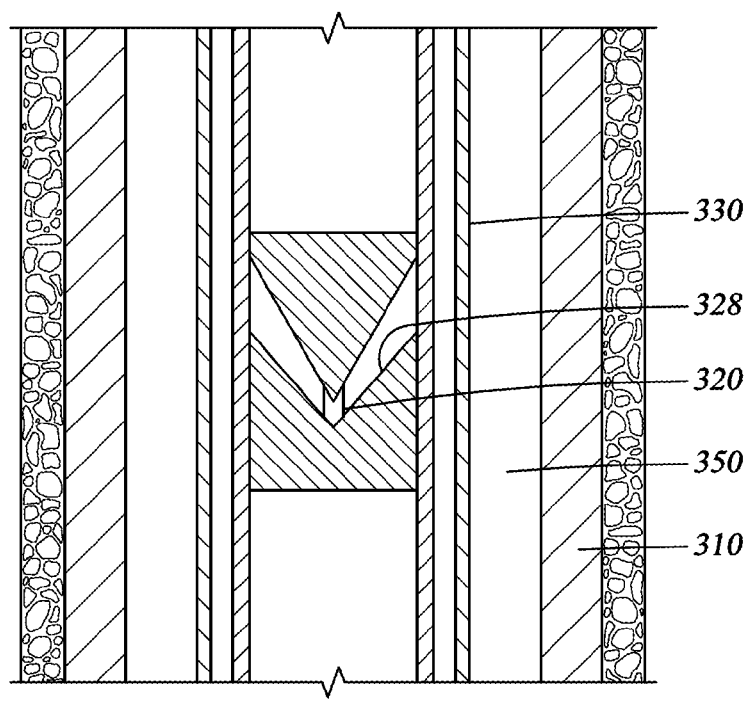

As a further illustration of an exemplary geometry of the embodiment illustrated in FIG. 3, FIGS. 4A and 4B show cross-sectional views of another embodiment of the tool disposed in base pipe or gravel-pack screen 330, which is further disposed in casing 310. A gravel pack 350 is disposed between the casing 310 and the base-pipe 330, where FIG. 4A shows a cross-section taken from the X-Y plane and where FIG. 4B shows a cross-section taken from the X-Z plane. As shown in the illustrated embodiment, source collimator 328 is conical shaped in the X-Z plane or Y-Z plane. Detector 340 is shown in FIG. 4A in openings or slots 345, whereas radiation source 320 is shown depicted in FIG. 4B. As shown in FIG. 4A, detector collimators 348 are fan-shaped in the X-Y plane and rectangular in the X-Z or Y-Z planes. In certain embodiments, a conical source collimator 328 is desirable as it reduces multiple scattering events in the gravel pack.

Methods of using the present invention may include the use of different energy windows to map voids or blockages in the gravel pack in low to high density completion fluids. In certain embodiments, at least four energy windows (FIG. 7) are used. For example, for a $^{137}$Cs source (source energy is 662 keV), the Low Energy (LE or $W_1$) window (typically from about 50 keV to about 200 keV) is sensitive to multiple scattered source gamma-rays, whereas the Medium Energy ($W_2$) window (typically from about 200 keV to about 250 keV) is sensitive to single-scattered source gamma rays. A Broad Window (BW or $W_3$) typically may include gamma rays in the range of about 50 keV to about 250 keV. A high energy window $W_6$ (also referred to herein as HE) typically may include gamma rays in the range between about 250 keV to about 650 keV nearly the source energy. The BW count rate has the highest statistical precision. The LE and Medium Energy windows may be used for specific applications, such as deep-reading and maximum-dynamic-range imaging capabilities. Combinations of these different energy window logs can be combined using special methods (e.g. ad-hoc adaptive or Kalman-type processing algorithms) for enhanced precision and resolution. It is recognized that multiple-intensity energy sources may be utilized in the same tool, either simultaneously or sequentially.

In addition to the energy levels of the radiation source, other factors that may be adjusted to discriminate segmented views of the gravel pack include, but are not limited to the angle of the collimators and the source to detector spacing. Examples of suitable angles of the source collimator include, but are not limited to, angles from about 15 degree to about 85 degree and from about 65 degree to about 85 degree in other embodiments. Examples of suitable source to detector spacing include, but are not limited to, from about 1 inch to about 3.5 inches to about 8 inches, and in other embodiments, from about 6 inches to about 10 inches, and in still other embodiments to about 12 inches.

Moreover, it is recognized that the downhole tool is capable of measuring count rates while being lowered or raised in the wellbore. In certain embodiments, the downhole tool may perform measurements while the tool is stationary in the wellbore. Exemplary raising and lowering rates include displacement rates of up to about 1800 feet/hour.

To facilitate a better understanding of the present invention, the following examples of certain aspects of some embodiments are given. In no way should the following examples be read to limit, or define, the scope of the invention.

EXAMPLES

Figure 5:
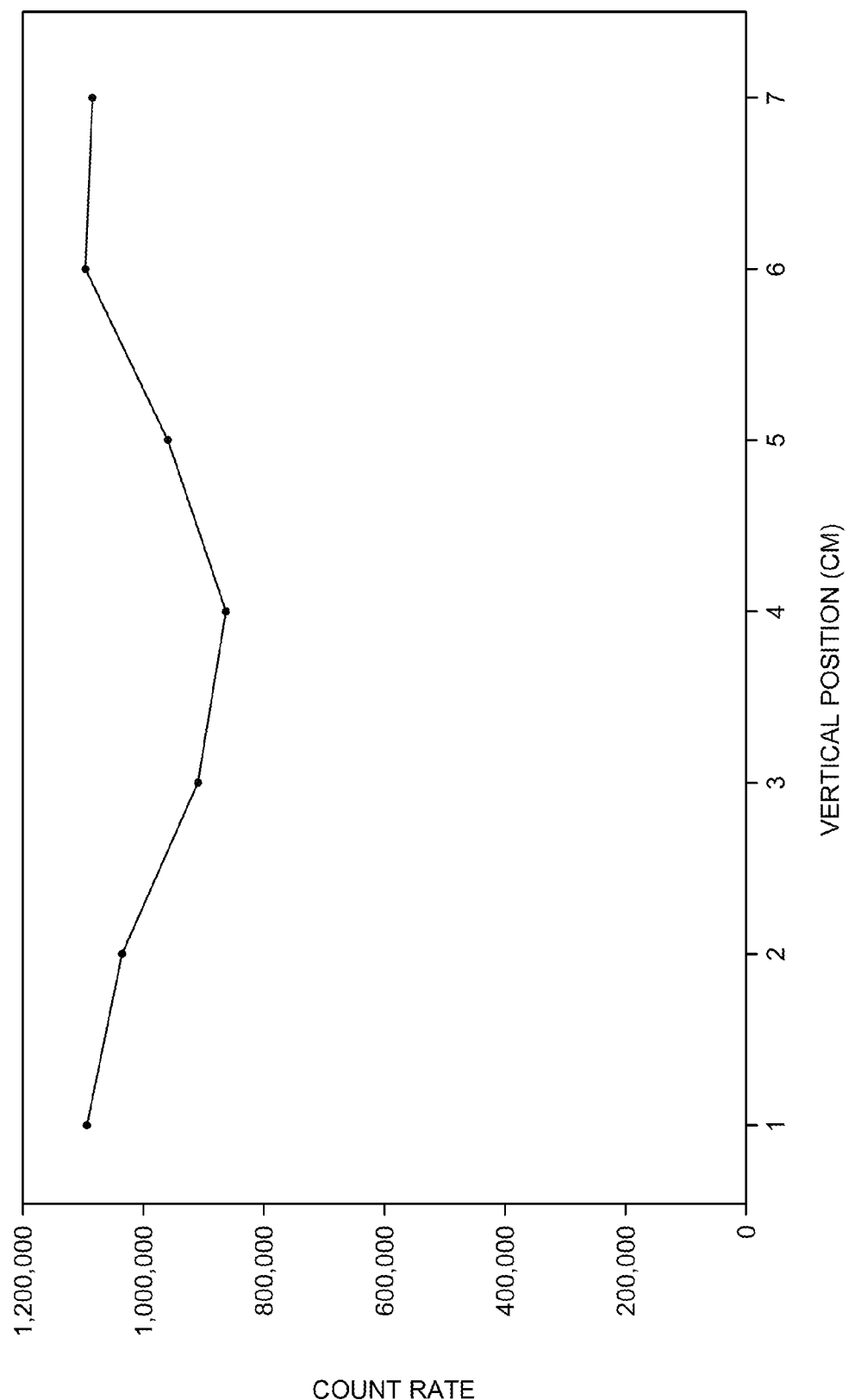
FIG. 5 is a graph of a single detector rate/logging response to an anomaly in a gravel-pack sand completion versus depth measured by an example embodiment of an imaging tool in accordance with the present invention.

In one non-limiting example of use, FIG. 5 shows a graph of a count rate versus depth in centimeters as measured by a 2.5 inch gravel-pack imaging tool in a 7 inch gravel pack. These logs were produced by processing individual detector gamma-ray count rates. The plot in FIG. 5 is an MCNP-modeled example of the count-rate sensitivity to a 1-inch annulus wash-out in a gravel pack centered at a depth index of 4-centimeters. It shows significant sensitivity to changes in the gravel pack density. MCNP refers to Monte Carlo N-Particle, developed by Los Alamos Monte Carlo Group and specifically titled "MCNP-A General Monte Carlo N-Particle Transport Code Version 5," Los Alamos National Laboratory Vols. I-III, April, 2003; and is available from Radiation Safety Information Computational Center at Oak Ridge National Laboratory as CCC-740. Qualitative image logs will be produced by displaying the relative count rates from each detector sector at each depth. Another means of analyzing the counts can be used to compute a more quantitative multi-sector density (i.e. in grams/cc) profile. Such a density log can be derived from the count rates by using a calibrated logging count rate-to-density algorithm.

Notably, traditional prior art density tools used to measure the gravel pack generally have a relatively large spacing between the source and the detector. The reason for this is that the tool is provided to evaluate the entire gravel pack at one azimuth without high spatial resolution. The source and detector are both typically located centrally in the tool along the tool's axis. Shielding may be provided along the axis between the source and the detector to prevent energy coupling between the two, i.e., energy passing directly from the source to the detector without scattering within the gravel pack. In the prior art, because of the relatively large spacing between the source and detector, the gamma ray radiation undergoes significant multiple scattering and absorption before it is detected and counted. The more dense the gravel pack, the fewer counts that are recorded. In other words, in the tools of the prior art, the count rate decreases with gravel pack density because the multiple scattering and absorption attenuates the total amount of radiation measured by the detectors.

In one example embodiment of the device and method of the present disclosure, the source and the detectors are closely positioned to one another, such as about 3.5 inches apart. Because of this close physical relationship, energy propagated into the gravel pack and scattered back to the detector undergoes much less scatter, i.e., typically only a single scatter (back to the detector) as opposed to multiple scattering. In fact, the count rates increase with the density of the gravel pack utilizing the tool of the invention. This is significant because improved density resolution is realized as compared to prior art.

Moreover, the prior art does not utilize a conically shaped collimator to direct the energy propagated into the gravel pack. Again, by utilizing such a collimator in the prior art tool, multiple scattering can be minimized and improve upon the imaging of the prior art tools.

Figure 6:
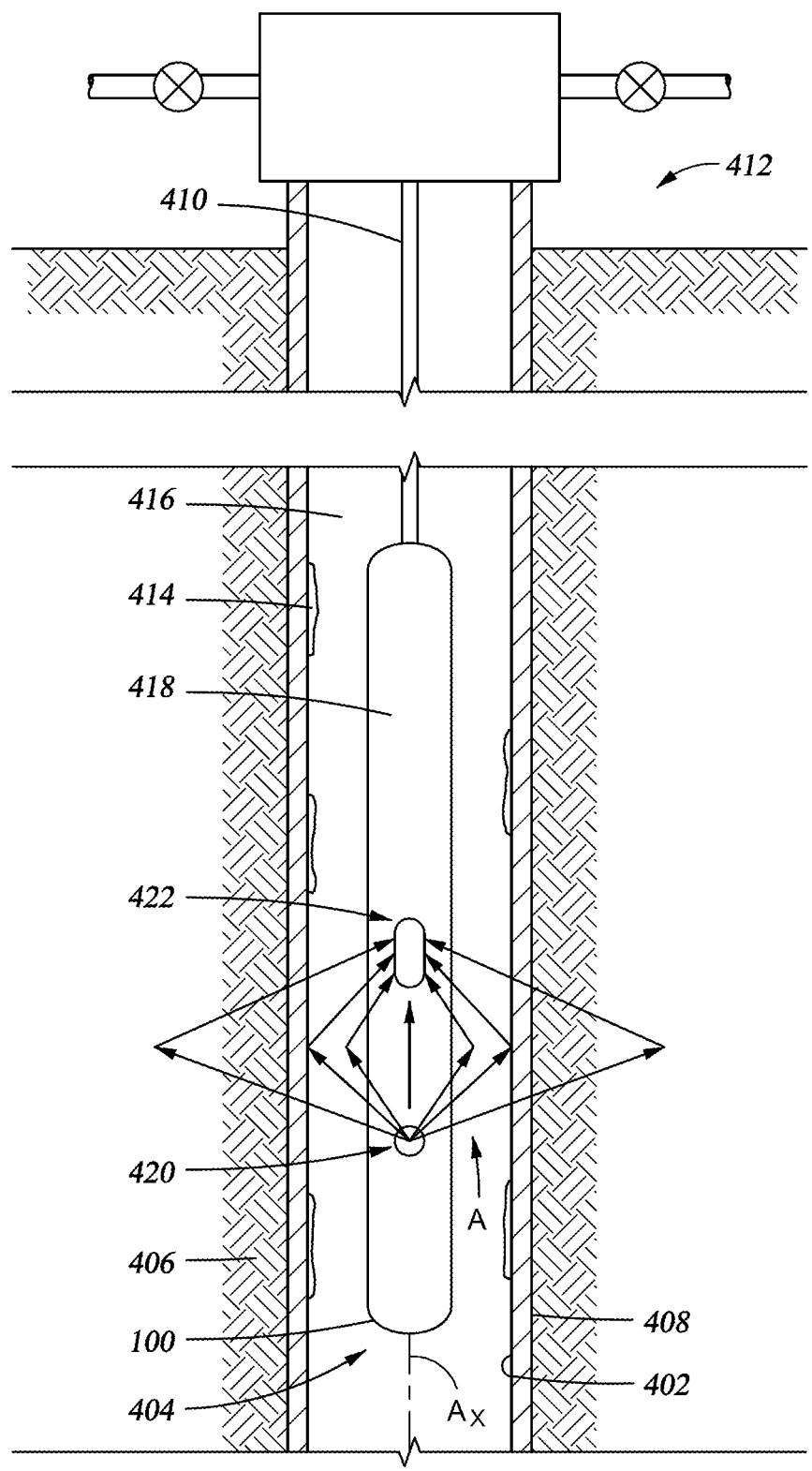
FIG. 6 is a partial side sectional view of an example of an imaging tool in a tubular in accordance with an embodiment of the present invention.

FIG. 6 illustrates in a partial side sectional view, an example of an imaging tool 400 inserted within a tubular 402. Embodiments exist wherein the tool 400 can be the same or substantially the same as the tools 100, 200 respectively of FIGS. 1 and 3 and described above. In the example of FIG. 6, the tubular 402 is inserted into a wellbore 404 that is shown intersecting a subterranean formation 406. Casing 408 is optionally provided in the wellbore 404 for lining the sidewalls of the wellbore 404. Thus in this example, the tubular 402 is production tubing. Alternate examples of use exist wherein the tool 400 is inserted within casing 408 having no production tubing within. The tool 400 is deployed in the wellbore 404 on a line 410, where the line 410 can be a wireline, slickline, cable, or coil tubing. The line 410 is shown inserted through a wellhead assembly 412 that is mounted on surface above an opening to the wellbore 404.

Further illustrated in the embodiment of FIG. 6 are deposits 414 that adhere to a sidewall of the tubular 402 at various depths in the wellbore 404 and azimuthal positions around an axis $A_X$ of the wellbore 404. The deposits 414 may include scale that forms on an inside of the tubular 402, as well as residue from fluid 416 shown disposed in the tubular 402. Other examples of residue include asphaltenes, paraffins, heavy hydrocarbons, sand, and combinations thereof. In the example of FIG. 6, the fluid 416 substantially occupies an annular space between a body 418 of the imaging tool 400 and an inner surface of the tubular 402. Further included with the embodiment of the tool 400 of FIG. 6 is a radiation source 420, which can be substantially the same as sources 220, 320 respectively of FIGS. 2 and 4B and described above. Radiation emitted from the source 420 can travel along a path represented by arrows A, which initially diverges from the axis $A_X$. Some of the radiation undergoes scattering and is redirected to converge with the axis $A_X$ at a location axially away from the source 420. As shown, the redirected radiation contacts sensor 422 where a count and associated energy of the radiation is detected. Examples exist wherein the sensor 422 includes detectors 140, 240 respectively of FIGS. 1 and 3 and discussed above.

Still referring to the example embodiment of FIG. 6, the radiation is directed in a conical pattern away from the source 420 and generally about a line intersecting the source 420 and sensor 422. As such, the radiation is shown Compton scattering from the fluid 416 in the tubular 402, an area proximate the sidewall of the tubular 402, and the formation 406. It should be pointed out that paths the radiation follows from the source 420 to the sensor 422 can intersect any point in a plane bisected by the axis $A_X$, and is not limited to the select number of arrows A that are illustrated for clarity.

Figure 7:
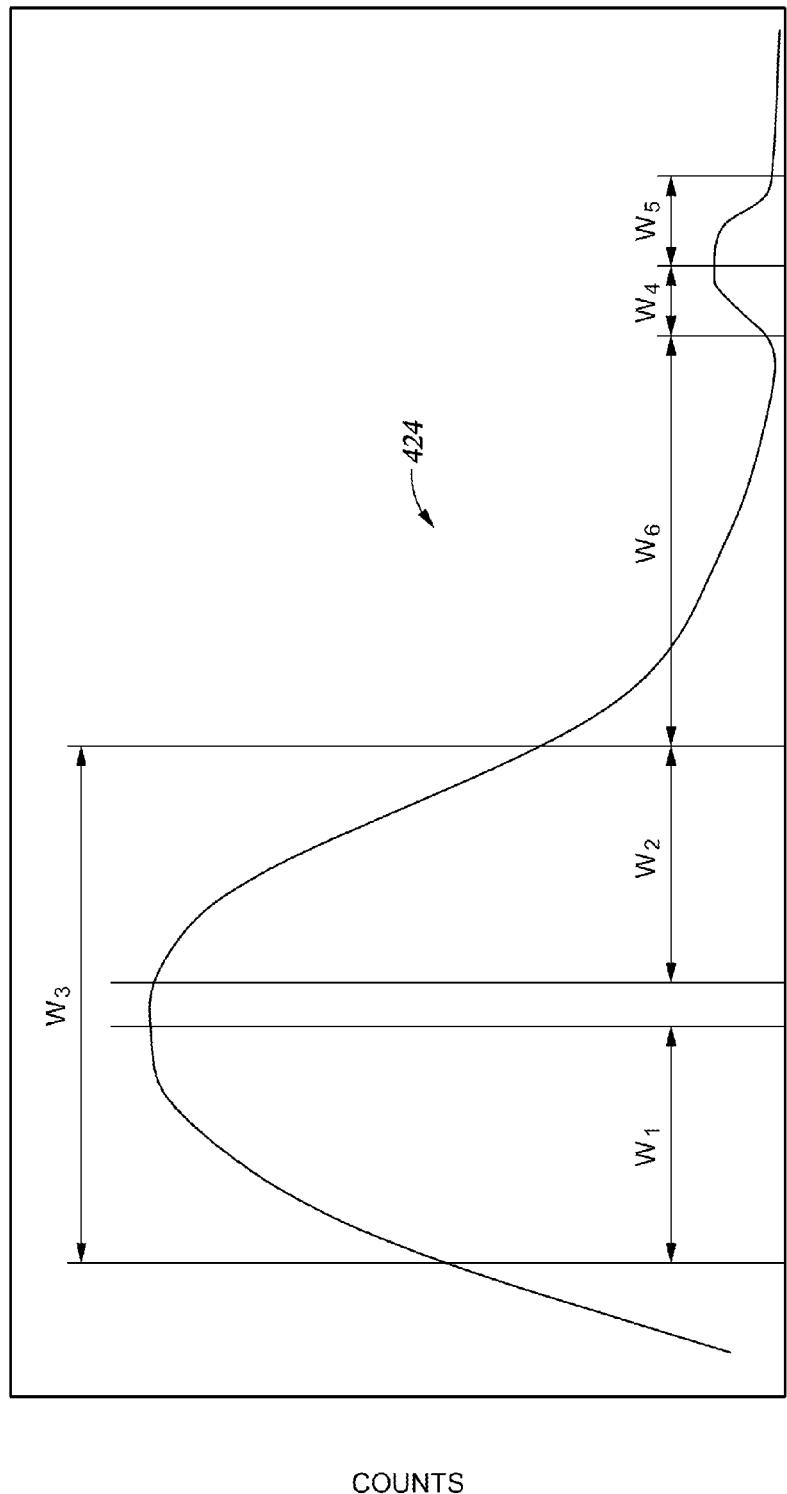
FIG. 7 is an example of a spectrum of count intensity versus count energy in accordance with an embodiment of the present invention.

As is known, the energy of the radiation detected by the sensor 422 is affected by the Compton scatter angle of the radiation (i.e. the angle of the directional change of the radiation). Generally, the energy decreases with increasing angles of scatter, as shown in FIG. 2; thus the radiation flowing directly from the source 420 to the sensor 422 which undergoes only minimal scattering will have a greater detected energy than the radiation scattered from adjacent the tubular 402 and the formation 406, and the radiation scattered from adjacent the tubular 402 will have a greater detected energy than the radiation scattered from the formation 406. Radiation counts detected by sensor 422 are binned based on an energy level of each count. As shown in the example of FIG. 7, the counts versus their corresponding energy are plotted to create a spectrum 424 to illustrate a distribution of detected energy of the radiation. Energy windows $W_1$-$W_6$ are shown superimposed on the spectrum 424 that extend along the energy axis. Counts of scattered radiation coming from the materials inside gravel pack, or materials between tubulars, or inside tubulars adjacent to the logging tool fall into windows $W_1$, $W_2$, $W_3$, or $W_6$. Counts of radiation that flow un-scattered and directly from the source 420 to the sensor 422 (FIG. 6) fall into windows $W_4$ or $W_5$ and can be used for tool gain stabilization. The counts of radiation that scatter from material deposited on or adjacent the tubular 402 are illustrated as being in window $W_6$. It is within the capabilities of those skilled in the art to create a spectrum as found in FIG. 7 and to identify the substances from which the radiation scatters based on the counts and corresponding energy of the created spectrum. Moreover, those skilled in the art are capable of identifying a spatial location of the identified substances based on the relative arrangement of the energy windows $W_1$-$W_6$.

Figure 8:
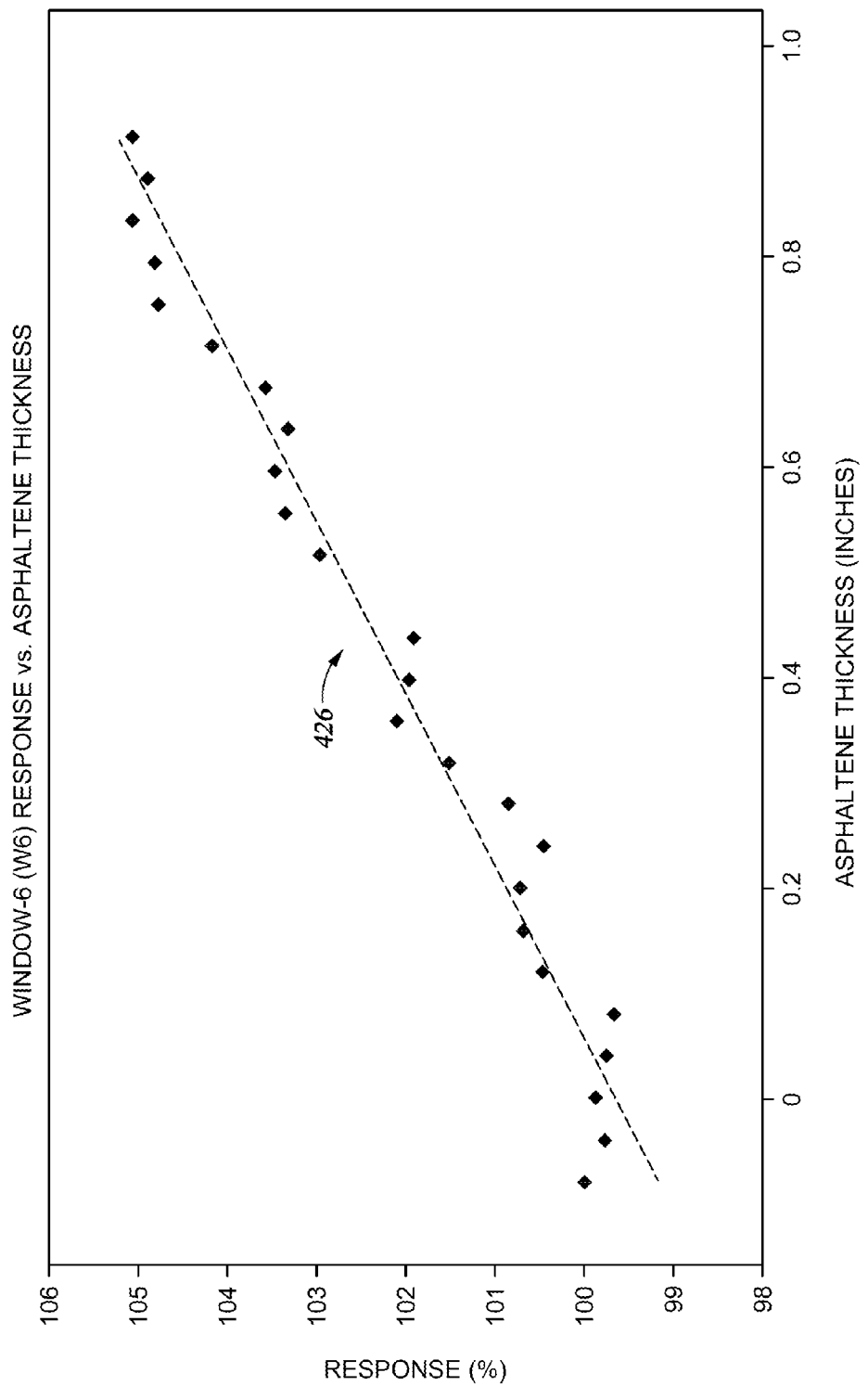
FIG. 8 is an example of a graph representing a high energy window (W6) count rate response to asphaltene deposits inside a production tubular in accordance with an embodiment of the present invention.

FIG. 8 provides a plot 426 illustrating example MCNP modeled results for the High Energy window $W_6$ count rate response dependence on the density-thickness product of an asphaltene deposit inside a 5½-inch tubular 402 of FIG. 6. In the example plot of FIG. 8, the $W_6$ count rate increases with increasing asphaltene-thickness, as expected from single shallow-angle Compton scattering adjacent to the logging tool. In an exemplar embodiment, count rates in the high energy window $W_6$ can depend on very shallow-angle Compton scattering, and are sensitive to density changes in the materials close to the logging tool. In one example, the high energy count rates $W_6$ can be used to detect blockages caused by an accumulation or build up in the production tubing of asphaltene, sand, scale, or combinations thereof. As such, by analyzing the portion of the spectrum 424 falling in window $W_6$ (FIG. 7), the matter adjacent the tubular 402 can be identified. The matter adjacent the tubular 402 includes the deposit 414 as illustrated in FIG. 6 on the inner surface of tubular 402, the fluid 416 in the tubular, matter in the fluid 416, the tubular 402 itself, matter on the outer radial surface of the tubular 402, and matter in the annulus between the tubular 402 and casing 408.

Figure 9:
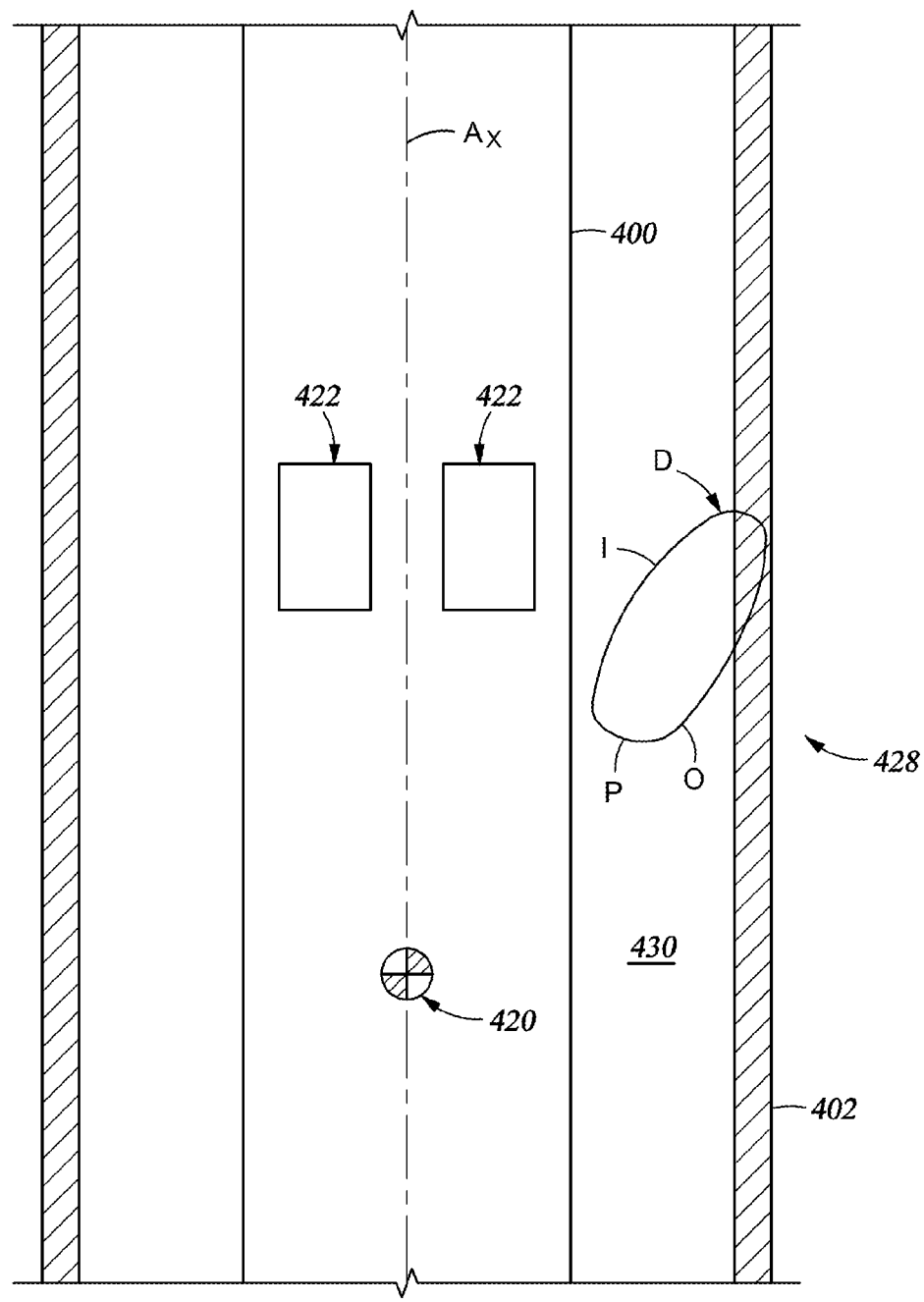
FIG. 9 is a schematic example of the imaging tool of FIG. 6 and a single scatter region of high energy radiation in accordance with an embodiment of the present invention.

Referring now to FIG. 9, illustrated is a side partial sectional view of a schematic example of the imaging tool 400 inserted within the tubular 402. Further shown is a region 428 that represents a zone where shallow-angle single scattered gamma rays are scattered from materials near the logging tool. Because shallow-angle Compton-scattered gamma rays lose very little of their initial energy, they fall into high energy window $W_6$ of the plot 424 of FIG. 7. In the example of FIG. 9, the region 428 has an outer periphery with inner and outer lateral edges I, O that angle away from the axis $A_X$ of the tool 400 and are joined at their distal ends by a distal edge D and a proximate edge P. In the example, the region 428 extends from adjacent the tool 400 past an outer surface of the tubular 402. More specifically, an intersection of the inner and proximate edges I, P is adjacent an outer surface of the tool 400 and an intersection of the distal and outer edges D, O is outside of the tubular 402. A Compton scattering equation can be used for generating the spatial locations that make up the region 428. Radiation scatter occurring in the region 428 has a relatively low angle compared with scatter that occurs radially past the region 428, as such, an energy level of radiation detected by the sensors 422 that is scattered from within the region 428, is greater than that of the energy level of shallow-angle radiation that scatters from areas radially past the region 428. In an example, the energy level of radiation scattered from within the region 428 and detected in $W_6$ by sensors 422 can range up to the source energy of about 662 keV.

What is claimed is:

1. A method of investigating a tubular in a subterranean wellbore comprising:
 a. directing radiation from a source to a sidewall of the tubular;
 b. detecting radiation scattered from a material adjacent the tubular;
 c. estimating a rate and energy of the detected radiation; and
 d. identifying the material based on the rate and energy of the detected radiation.

2. The method of claim 1, wherein the radiation composes gamma rays, and wherein the scattered radiation when detected has energy of from about 250 keV to about 650 keV.

3. The method of claim 1, wherein the step of detection is performed using a detector axially offset from the source.

4. The method of claim 3, wherein the radiation is directed in a substantially conical pattern from the source and wherein the energy of the detected radiation is dependent upon an angle of scatter of the radiation.

5. The method of claim 1, wherein the material comprises matter selected from the group consisting of asphaltene, scale, sand, paraffin, and combinations thereof.

6. The method of claim 5, further comprising estimating a location of the substance based on the steps of identifying the substance and estimating the location of the substance.

7. The method of claim 1, wherein when substances are identified on the tubular, the detected radiation is high-energy radiation that ranges from about 250 keV to about 650 keV.

8. The method of claim 1, wherein the substance comprises production fluid in the tubular, and tubular comprises production tubing.

9. A method of imaging in a subterranean wellbore comprising:
 a. providing a logging instrument having a radiation source and a scattered radiation detector;
 b. disposing the logging instrument in a tubular that is inserted into the wellbore;
 c. directing radiation from the source so that some of the radiation undergoes single Compton scatterings from a substance disposed adjacent the tubular to define scattered radiation;
 d. detecting the single Compton scattered radiation with the scattered radiation detector; and
 e. identifying the substance deposited in or on a tubular based on a rate and energy of the single Compton scattered radiation detected.

10. The method of claim 9, wherein a conically shaped guide is provided proximate the radiation source and positioned in the logging instrument so that an apex of the guide is directed towards the source and the guide has an axis that is substantially parallel with an axis of the tubular.

11. The method of claim 9, wherein the energy of the scattered radiation corresponds to an angle of scatter of the detected radiation.

12. The method of claim 9, wherein the substance comprises matter selected from the group consisting of an asphaltene, a paraffin, scale, sand, and combinations thereof.

13. The method of claim 9, wherein the radiation is directed in a substantially conical pattern from the source and wherein the enemy of the detected radiation is dependent upon an angle of scatter of the radiation.

14. The method of claim 9, further comprising providing a multiplicity of detectors at spaced apart locations around a circumference of the logging instrument, viewing different circumferentially spaced apart segments with the detectors, and imaging substantially an entire circumference of a lengthwise portion of the tubular.

15. The method of claim 14, wherein the radiation is directed in a substantially conical pattern from the source and wherein the energy of the detected radiation is dependent upon an angle of scatter of the radiation, the method further comprising monitoring count rates from different window energy regions of the radiation and selecting an angle of Compton scattering to interrogate different regions around the logging instrument based on the monitored count rates.

16. The method of claim 15, wherein the highest energy detected is scattered from material proximate the logging instrument.

17. The method of claim 16, wherein the highest energy detected is scattered from a material deposit along an inner surface of the tubular.

18. The method of claim 15, wherein the scattered radiation detected in step (d) comprises gamma rays, each having an energy that ranges from about 250 keV to about 650 keV.

* * * * *